No. 834,878. PATENTED NOV. 6, 1906.
F. ANDERSON.
STOP VALVE.
APPLICATION FILED OCT. 30, 1906.

Witnesses:

Inventor:
Frederic Anderson

UNITED STATES PATENT OFFICE.

FREDERIC ANDERSON, OF JOHANNESBURG, TRANSVAAL, ASSIGNOR OF ONE-HALF TO JOHN DOWELL ELLIS, OF JOHANNESBURG, TRANSVAAL.

STOP-VALVE.

No. 834,878.              Specification of Letters Patent.             Patented Nov. 6, 1906.

Application filed October 30, 1905. Serial No. 284,974.

*To all whom it may concern:*

Be it known that I, FREDERIC ANDERSON, a subject of the King of Great Britain, residing at Johannesburg, Transvaal, have invented certain new and useful Improvements in Stop-Valves, of which the following is a specification.

This invention has reference to that kind of valve known as a "straightway" valve.

A valve constructed in accordance with my invention is equally applicable for steam or other gaseous fluid or for water or other liquid. The valve is of simple, efficient, and cheap construction, and it is not so liable to get out of order as the present valves. Further, it is operated more easily and more quickly than the existing types of straightway valves, and the present improvements obviate "chattering" of the valve-faces, and thereby minimize the wear and tear on both the faces and valve. By my improvements I am able to dispense with the long screw and with one gland, while the valve can be locked or secured in any position, like an ordinary valve.

To facilitate the detailed description of my invention, I append an explanatory sheet of drawings marked with numerals of reference corresponding to the following description.

Figure 1:
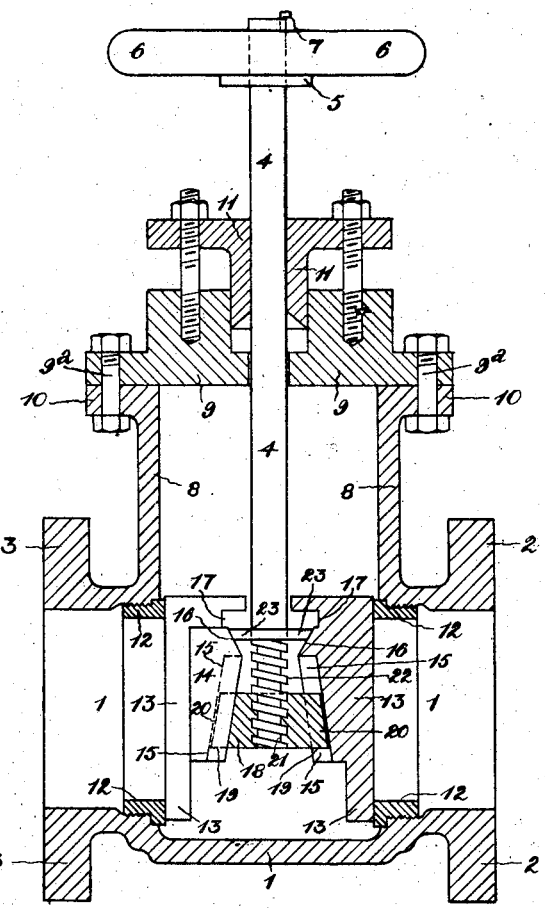
Figure 2:
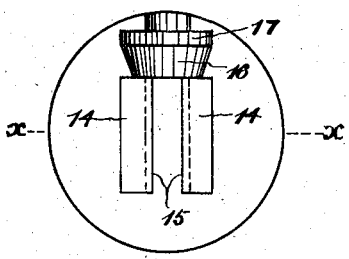
Figure 3:
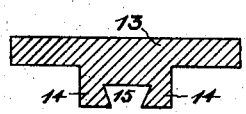
Figure 4:
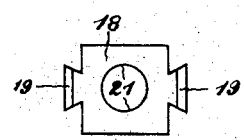

In the drawings, Figure 1 depicts in sectional elevation a valve of the type referred to. Fig. 2 is a back view of one-half the valve. Fig. 3 is a section of Fig. 2 on line $x$ $x$, and Fig. 4 is a plan of the nut 18 detached.

The body of the valve is represented at 1, constructed in the customary manner with the end flanges 2 3 for fixing the valve in any desired position in any ordinary or suitable manner.

4 is the spindle, which serves for actuating the valve. It is constructed or fitted at or in proximity to its upper end with a collar or annular projection or enlargement 5, and secured on the upper end of the spindle 4 and above the collar 5 is a hand-wheel 6, by means of which the spindle 4 may be rotated in either direction. This hand-wheel 6 may be fixed onto the upper extremity of the spindle by means of the key 7 or in any other suitable manner. The body 1 of the valve is constructed with the branch 8, which is made of sufficient length to permit the valve to be raised sufficiently far to fully open it.

9 is a cover or cap fixed by the bolts 9ª to the flange 10, formed round the upper end of the branch 8. In and to this cover 9 is adjustably secured the gland 11, through which works the spindle 4.

12 represents externally-threaded rings screwed into the body 1 on the inside to provide hard-metal seats for the valve. The valve proper comprises the two circular parts 13, which at the back are constructed with projections 14, forming a dovetail or other suitable angular slot or groove 15, inclined inward from the bottom to the top, as indicated in Fig. 1. Above the angular slot 15 the back of the valve is curved and inclined, as indicated at 16, in the opposite direction and at the top is constructed with the curved recess 17. (See Figs. 1 and 2.) Between the two parts 13 and fitting the dovetail slots or grooves 15, formed in the backs thereof, is the nut or piece 18, (illustrated in Fig. 4,) which is constructed with dovetail or other suitable angular projections 19, corresponding to the grooves 15 and adapted to slide therein in consonance with the movement of the valve-spindle 4. The dovetail or angular projections 19 on the nut 18 are beveled or inclined, as indicated at 20, to correspond to the inclination of the dovetail or angular slots or grooves 15 in the back of the two parts 13 of the valve. The nut 18 is formed with a screw-threaded hole 21.

The lower and inner extremity of the spindle 4 is constructed with a screw-thread 22 for a portion of its length, which screw-thread 22 corresponds in shape and pitch to the thread in the nut 18, into which it is screwed. On the spindle 4, above the screw-threaded portion 22, is formed or fitted a collar or annular projection 23, which is inclined or beveled off to correspond to the inclination or bevel 16 in the back of the parts 13.

In Fig. 1 the valve is shown in its closed position. It is maintained in this position by the pressure exerted on the parts 13 of the valve by the nut 18 and the collar 23. The dovetail or angular projections 19 of the nut fitting the dovetail or angular grooves 15 in the back of the valve are forcing the parts 13 of the valve outward, while the beveled collar 23, engaging the beveled or inclined recess 16, is also tending to force the parts 13 of the valve on their seats. The action of screwing the valve-spindle 4 to the right tends to raise the nut in the wing-guides 15 and brings the collar 23 into engagement with the inclines 16 in the recess 17. When the spindle 4 is rotated in the opposite direction, it screws out of the nut 18 and raises the collar 23 until the latter engages the projections forming the recess 17. This tends to lift the valve and bring the parts 13 together. When the parts 13 of the valve are free of the valve-face, the spindle 4 may then be lifted as desired to open the valve to the required extent and the spindle be then rotated in the opposite direction, which in the manner previously explained locks the valve in the position in which it has been placed.

What I claim as my invention, and desire to protect by Letters Patent, is—

1. In a valve of the nature specified, the combination with a spindle having a threaded portion and a collar above said threaded portion inclined or beveled round the edge, a valve comprising two parts formed at the back with angular grooves inclined in an inward direction from the top to the bottom, the nut engaging said angular grooves in such manner that when the nut is moved in one direction it draws the two parts of the valve inward and when moved in the reverse direction forces them outward, the two parts of the valve being also constructed with a beveled or inclined portion engaged by the beveled collar and with a recess above said beveled portion as and for the purpose set forth.

2. In a valve of the nature specified, the combination with a spindle having a threaded portion and a collar above said threaded portion beveled off at the edge a valve consisting of two parts each part having formed on the back a dovetail groove which is inclined in a downward direction, a nut constructed with dovetail projections and adapted to work in the dovetail grooves in the back of the two parts of the valve in such manner that when the spindle is rotated the nut is drawn upward and the beveled collar caused to engage a beveled recess formed on the back of the two parts of the valve above the dovetail grooves so that on rotation of the spindle in one direction it forces the two parts of the valve asunder to close or lock the valve, and when rotated in the reverse direction draws the two parts of the valve together to free them from the valve-faces, substantially as described.

3. In a valve of the nature specified, the combination with a spindle having a threaded inner end and a collar or annular enlargement at the top of said threaded portion, said collar or enlargement being beveled off or inclined downward round its edge, a valve consisting of two parts having projections formed on the back providing an inwardly-inclined dovetail groove from the top to the bottom and with an inclined recess above said dovetail groove and a further curved recess above the inclined recess, a nut formed with a screw-threaded hole through which the screwed portion of the spindle works and with inclined dovetail projections to fit the inclined dovetail grooves in the back of the valve, substantially as and for the purposes set forth.

4. In a valve of the nature indicated, the body 1 formed with the flanges 2, 3, and the branch 8 with the flange 10, the rings 12 screwed into the body 1 to form the valve-seating, the spindle 4 formed with a screw-threaded inner end 22 and with the collar 23 beveled round the edge in a downward direction and with the collar 5 at its upper end, the hand-wheel 6 fixed to the spindle 4 above the collar 5, the cover 9 bolted to the top of the branch 8 and the gland 11 next the cover 9, the valve consisting of the two circular plates 13 formed with the wing-guides 14 forming the dovetail grooves 15 and with the curved inclined recess 16 above said grooves 15 and recess 17 above the recess 16, and the nut 18 formed with the screw-threaded hole 21 and with the inclined dovetail projections 19 fitting the grooves 15, substantially as described and illustrated.

In witness whereof I have hereunto set my hand in the presence of two subscribing witnesses.

FREDERIC ANDERSON.

Witnesses:
 CHAS. OVENDALE,
 R. OVENDALE.